Jan. 12, 1926.  1,569,840

A. S. MACDONALD

FLEXIBLE JOINT

Filed July 21, 1920

WITNESS.
Gustav Ginglinger.

INVENTOR.
Angus S. Macdonald
BY Symmestuat & Lechner
ATTORNEYS.

Patented Jan. 12, 1926.

1,569,840

UNITED STATES PATENT OFFICE.

ANGUS S. MACDONALD, OF GREAT NECK, NEW YORK, ASSIGNOR, BY MESNE ASSIGNMENTS, TO SPICER MANUFACTURING CORPORATION, OF SOUTH PLAINFIELD, NEW JERSEY, A CORPORATION OF VIRGINIA.

FLEXIBLE JOINT.

Application filed July 21, 1920. Serial No. 397,846.

*To all whom it may concern:*

Be it known that I, ANGUS S. MACDONALD, a citizen of the United States, and residing at Great Neck, county of Nassau, and State of New York, have invented certain new and useful Improvements in Flexible Joints, of which the following is a specification.

This invention relates to flexible joints such as used, for example, in automotive drive assemblies or other torque transmitting devices.

One of the primary objects of the invention is to provide a simple and inexpensive joint of this character which has great strength and relatively long life. Another of the objects of the invention resides in the provision of an improved means for connecting the flexible torque transmitting elements, such as discs, to the spider members on the respective shafts to be connected.

Figure 1:
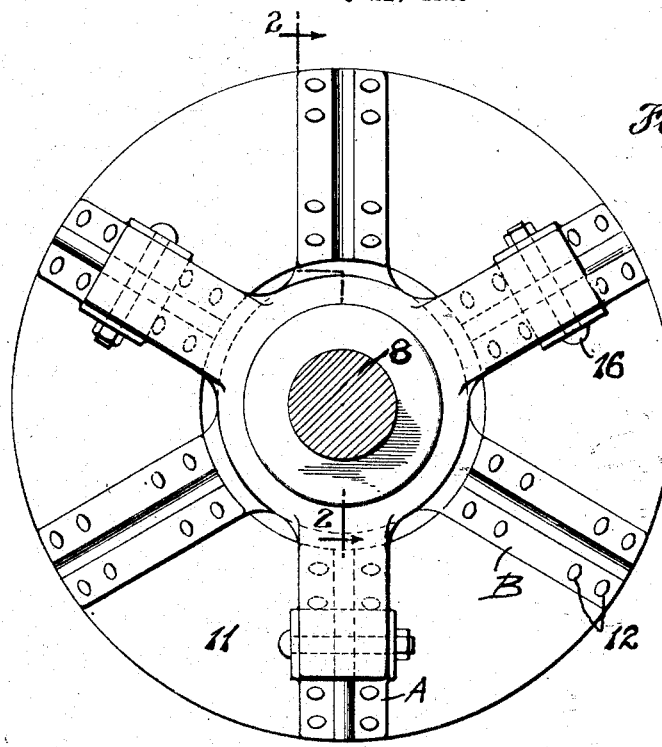
Figure 2:
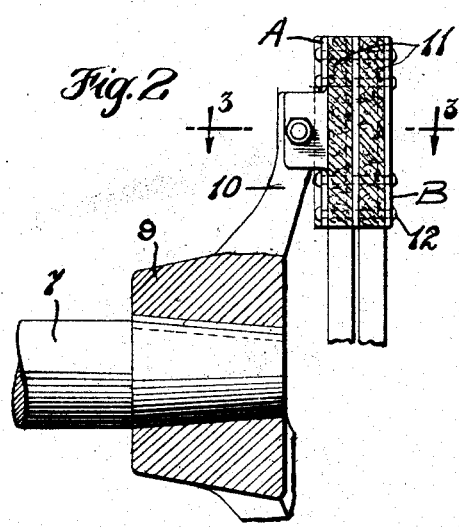
Figure 3:
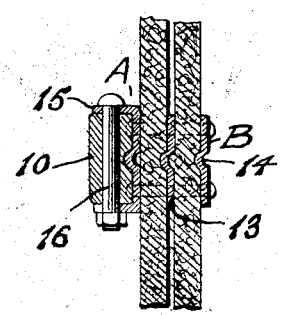

The foregoing, together with such other objects as may hereinafter appear, I obtain by means of a construction which I have illustrated in preferred form in the accompanying drawings, wherein:

Fig. 1 is a section through a shaft illustrating my improved joint in end elevation; Fig. 2 is a section taken on the line 2—2 of Fig. 1; Fig. 3 is a section taken on the line 3—3 of Fig. 2.

Referring now to the drawings, one of the shafts to be connected is indicated by the reference numeral 7, and the other shaft by the reference numeral 8. Each shaft is provided with a spider 9 having a plurality of arms, feet or projections 10, preferably three in number, the spiders being so arranged that the feet are disposed at angles of 60° with respect to each other. The flexible element in the embodiment shown consists of one or more discs 11 composed of leather, rubberized fabric, cord or the like. The discs are connected to the respective spider feet in the following manner:

I provide a plurality of plates A, one for each spider foot, in this instance three of such plates being on one side of the disc and three on the opposite face at intervals circumferentially around the disc. A similar number of plates B are located opposite the plates A and the pairs are secured together by means of a plurality of rivets 12 which extend through the disc. Where more than one disc is used, spacing washers, corresponding in shape to plates B, are located intermediate the discs, such washers being indicated by the reference number 13. The rivets 12 also pass through these washers. The discs, plates, and washers are assembled as a unit by placing them in a suitable press, adapted to apply the desired amount of pressure to secure a proper grip on the disc, after which the rivets 12 are put in place. In order to strengthen the grip of the plates and washers on the disc, I prefer to roughen the plates and washers, as for example, by corrugating them or beading them, as illustrated at 14. The rivets are preferably oval in cross section, with the longest dimension extending parallel the line of torque strain, this being a construction which is particularly valuable where fabric or cord discs are employed, for the reason that in inserting the rivets, the fabric or cord will be thrust to one side and not broken, the amount of offset given being very small because of the shape of the rivets. In this fashion the whole strength of the material is retained while at the same time the plates and washers exert a firm grip upon the discs. The plates and washers also extend across the full width of the discs.

The plates A have a forked or channel shaped portion comprising laterally projecting torque transmitting engagement means at their outer sides in the form of lugs 15 adapted to embrace the spider feet 10, and they are secured to the spider feet by means of the bolts 16 in the manner illustrated in Fig. 3.

It will be apparent that the discs and plates can be quickly assembled and secured together, and that the assembled flexible units can be quickly attached to the spiders. It will furthermore be seen that the attaching bolts are subjected to no appreciable strain, the thrusts being taken for the most part by the channel shaped portions 15 of the plates A. The plates A being secured to the spider without penetration of the disc by the attaching means, the joint will have greater strength than is possible to obtain in the standard flexible joint in which the discs are apertured to receive holding bolts which pass through the spider feet, and this, together with the feature of gripping the discs across their full radial width, renders the device peculiarly adaptable to discs of the cord type, in which the structure of the discs would be materially weakened were any of the cords to be pierced or broken. The rivets are relatively small and have their greatest strength in the line of torque strain, in which connection it is to be observed that the major portion, if not all of the torque stresses are taken up by the plates and washers by reason of the firm grip of the latter on the material.

Other advantages incident to my improvements will be understood by those skilled in the art.

I claim:

1. In a flexible joint, the combination of a spider, a flexible disc, and means for connecting said disc, to the spider comprising a pair of plates on opposite faces of the disc and means for securing the plates together, one of said plates having a channel-like portion to embrace the spider.

2. In a flexible joint, the combination of a spider, a flexible disc, means for connecting said disc with the spider, said means consisting of a pair of pressed metal plates secured to the disc by riveting, one of said plates carrying laterally projecting integral ears, adapted to be secured to the arm of the spider.

In testimony whereof, I have hereunto signed my name.

ANGUS S. MACDONALD.